(12) United States Patent
Komatsu

(10) Patent No.: US 6,721,501 B2
(45) Date of Patent: Apr. 13, 2004

(54) INSTALLATION STRUCTURE FOR INSTALLING CAMERA

(75) Inventor: Hiroyuki Komatsu, Tokyo (JP)

(73) Assignee: Keiyo Engineering Co., Ltd., Tokyo (JP)

(*) Notice: Subject to any disclaimer, the term of this patent is extended or adjusted under 35 U.S.C. 154(b) by 0 days.

(21) Appl. No.: 10/383,591

(22) Filed: Mar. 10, 2003

(65) Prior Publication Data

US 2003/0175027 A1 Sep. 18, 2003

(30) Foreign Application Priority Data

Mar. 12, 2002 (JP) ........................................ 2002-067046

(51) Int. Cl.[7] .............................................. G03B 21/22
(52) U.S. Cl. ........................ 396/429; 396/427; 348/143
(58) Field of Search ................................ 396/419, 427, 396/429; 348/143

(56) References Cited

U.S. PATENT DOCUMENTS

| | | | | |
|---|---|---|---|---|
| 4,750,011 A | * | 6/1988 | Kajiura et al. | 396/427 |
| 5,418,567 A | * | 5/1995 | Boers et al. | 348/375 |
| 5,729,016 A | * | 3/1998 | Klapper et al. | 250/334 |
| 5,793,419 A | * | 8/1998 | Fraley | 348/143 |
| 5,995,053 A | * | 11/1999 | Curtis | 343/715 |
| 6,268,882 B1 | * | 7/2001 | Elberbaum | 348/151 |
| 6,537,936 B1 | * | 3/2003 | Busam et al. | 442/381 |
| 6,542,182 B1 | * | 4/2003 | Chutorash | 348/148 |

* cited by examiner

Primary Examiner—Russell Adams
Assistant Examiner—Michael Dalakis
(74) Attorney, Agent, or Firm—Kanesaka & Takeuchi

(57) ABSTRACT

An installation structure for a camera includes a frame having an installation hole, and a bolt having a through hole therein. The bolt passes through the installation hole and fixed to the frame. A camera body is fixed to the frame through the bolt, and a cable of the camera passes through the hollow screw portion. The bolt may be integrally formed with the camera. Further, the camera may be fixed with the bolt via a variable angle installation member to adjust a viewing angle of the camera.

3 Claims, 6 Drawing Sheets

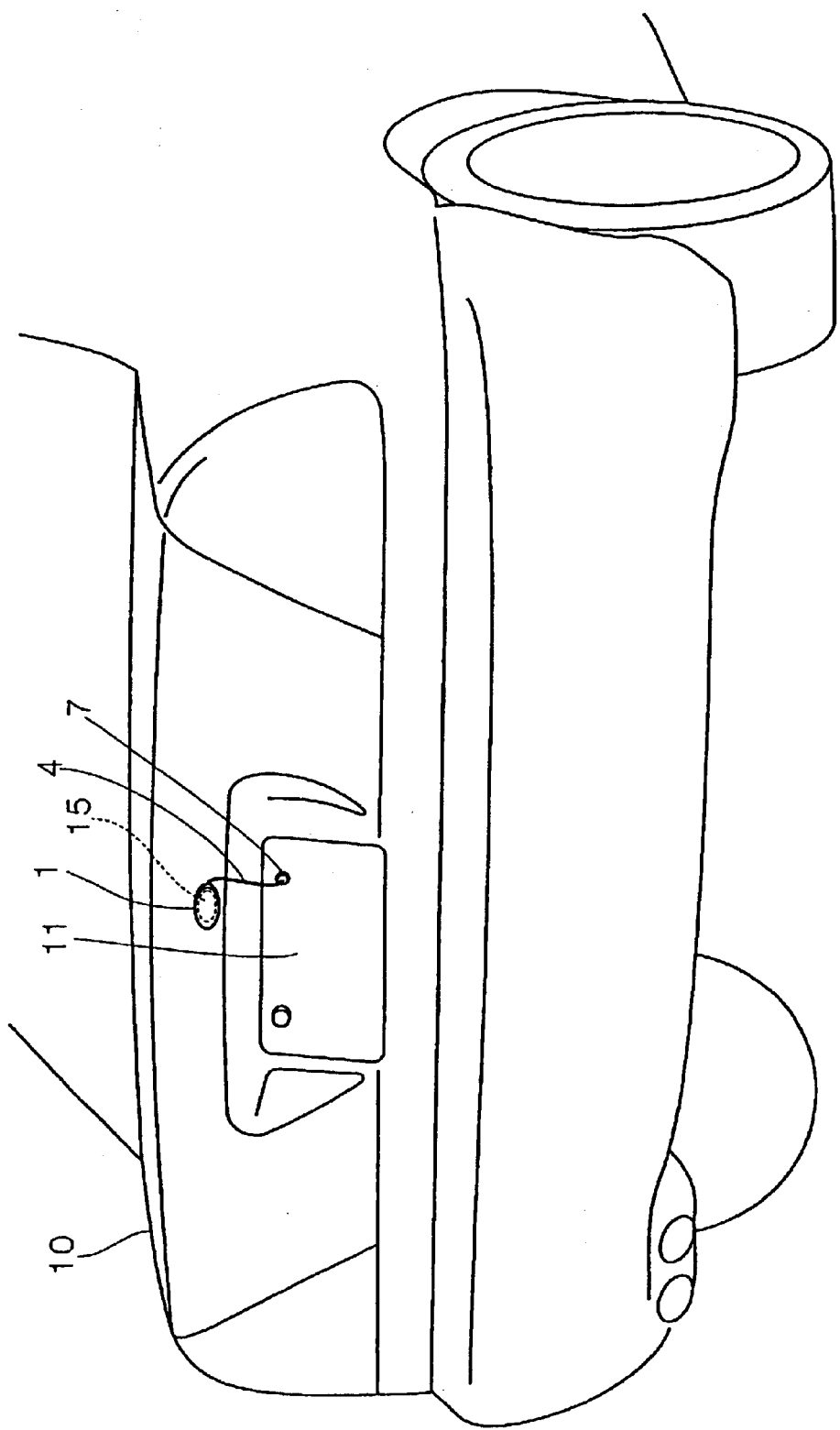

INSTALLATION STRUCTURE FOR INSTALLING CAMERA

BACKGROUND OF THE INVENTION AND RELATED ART STATEMENT

The invention relates to an installation structure for installing a camera in a car or an entrance door of a house.

In recent years, a camera is used for monitoring a rear view of a car or a visitor at an entrance of a house. This kind of camera generally includes a camera, a power supply, a monitor, and a cable including a power cable for supplying power from the power supply to the camera and a signal cable for transmitting a signal between the camera and the monitor.

The camera is installed at a position to be monitored, and then the cable extending from the camera is connected to the power supply and monitor placed away from the camera. With such a structure, an image taken by the camera is viewed on the monitor.

In the case of installing this kind of camera in the car, the camera is attached to the car in such way that the power supply and the monitor are installed in the car, and the camera with the cable is fixed to a desired location of the car by a screw or a double-sided adhesive tape, and the like.

When the camera is installed in the entrance door of the house, the power supply and the monitor are placed inside the house, and the camera with the cable is fixed to a desired place of the door by a screw or a double-sided adhesive tape, and the like.

However, in the conventional installation structure for installing the camera mentioned above, in the case of fixing the camera by a screw, there has been a problem of punching a hole somewhere on the entrance door or the car body. Especially in the case of the car, the hole damages an appearance of the car after the camera is removed, and affects a resale value of the car. When the double-sided adhesive tape is used for installation, the hole as mentioned above is not necessary. However, after the camera is removed, an adhesive mark remains on a surface, or if the tape loses adhesion with time, the camera may come off.

Further, it is still necessary to provide a hole in the car or the door for the cable to pass through properly. Especially, when the camera is installed in the door for safety, there is a problem that the cable might be cut off.

In order to resolve the problems mentioned above, an object of the invention is to provide an installing structure for installing the camera and wiring the cable properly.

Further objects and advantages of the invention will be apparent form the following description of the invention.

SUMMARY OF THE INVENTION

In order to achieve the above mentioned objects, according to the first aspect of the invention, an installation structure for installing a camera includes a case holding the camera and having a hole, a frame with a hole, a bolt inserted in the holes of the case and the frame and having a hole formed in the bolt along an axis thereof for inserting a cable, so that the camera is fixed to the frame with the bolt and a nut, and the cable passes through the hole of the bolt.

According to the second aspect of the invention, in the installation structure for a camera according to the first aspect, the boll is integrated with the camera.

According to the third aspect of the invention, in the installation structure for a camera according to the first aspect, the camera is fixed with the bolt via a variable angle installation member so that a viewing angle of the camera is adjustable.

According to the fourth aspect of the invention, an installation structure for a camera includes a frame with a hole, a bolt inserted in the hole of the frame and having a hole for inserting a cable, and a magnet for fixing the camera to a desired position of the frame, so that a cable passes through the hole of the bolt.

According to the fifth aspect of the invention, in the installation structures for a camera according to the first aspect to the fourth aspect, the frame is a part of a car body, the hole of the frame is a hole for fixing a license plate of the car.

According to the sixth aspect of the invention, in the installation structures for a camera according to the first aspect to the fourth aspect, the frame is a door, the hole is a peephole of the door, and the bolt is inserted in the peephole where a peephole lens is originally installed.

BRIEF DESCRIPTION OF THE DRAWINGS

FIG. 6 is a perspective view showing another example of use of the installation structure for a camera;

DETAILED DESCRIPTION OF PREFERRED EMBODIMENTS

Hereunder, embodiments of the invention will be explained with reference to the accompanying drawings.

Figure 1:
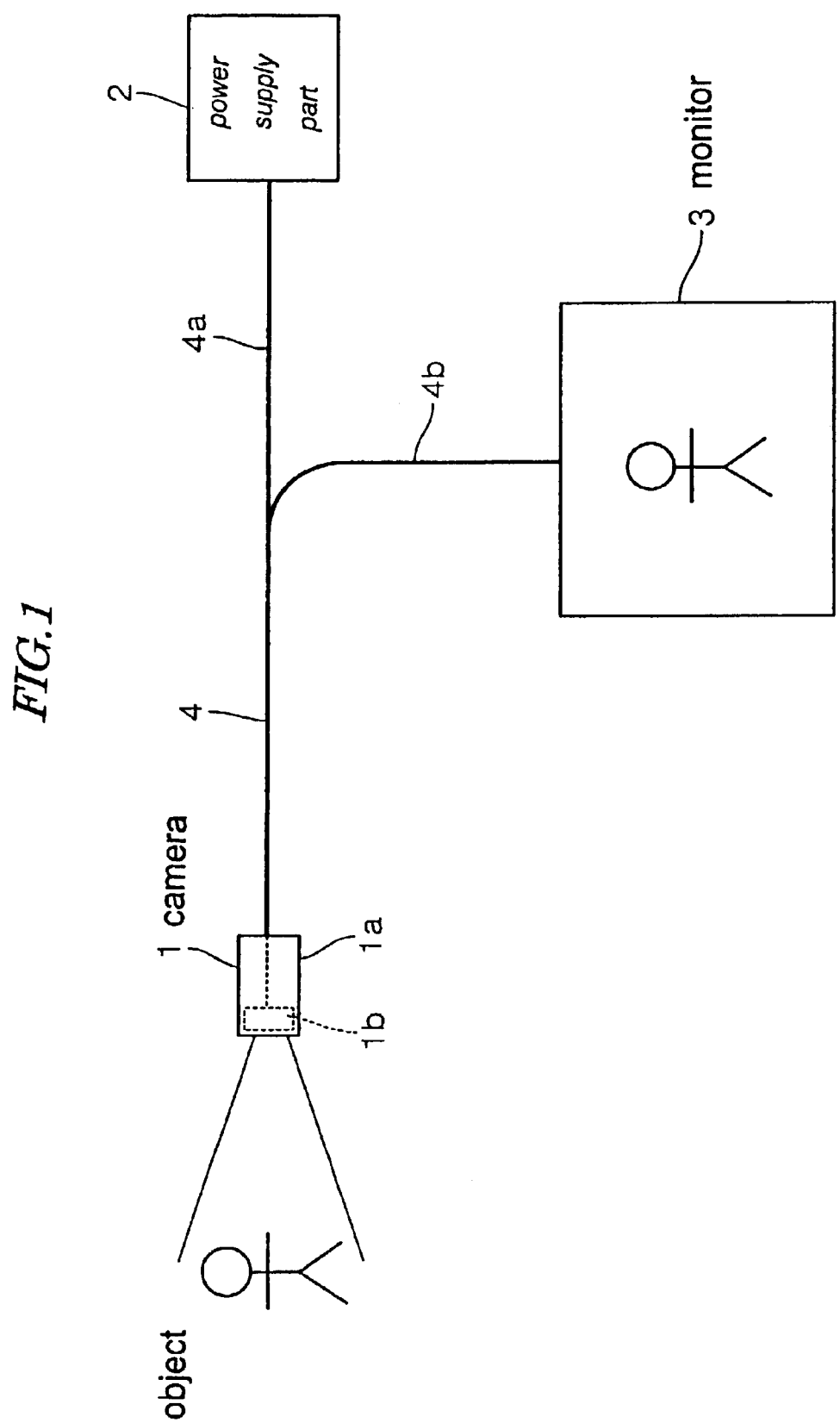
FIG. 1 is an explanatory view showing a structure of a camera system.
Figure 2:
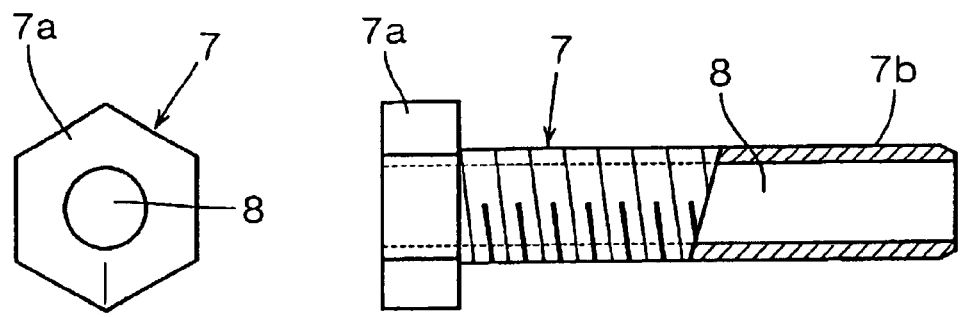
FIG. 2 is a partial sectional view showing a bolt of an installation structure for a camera.
Figure 3:
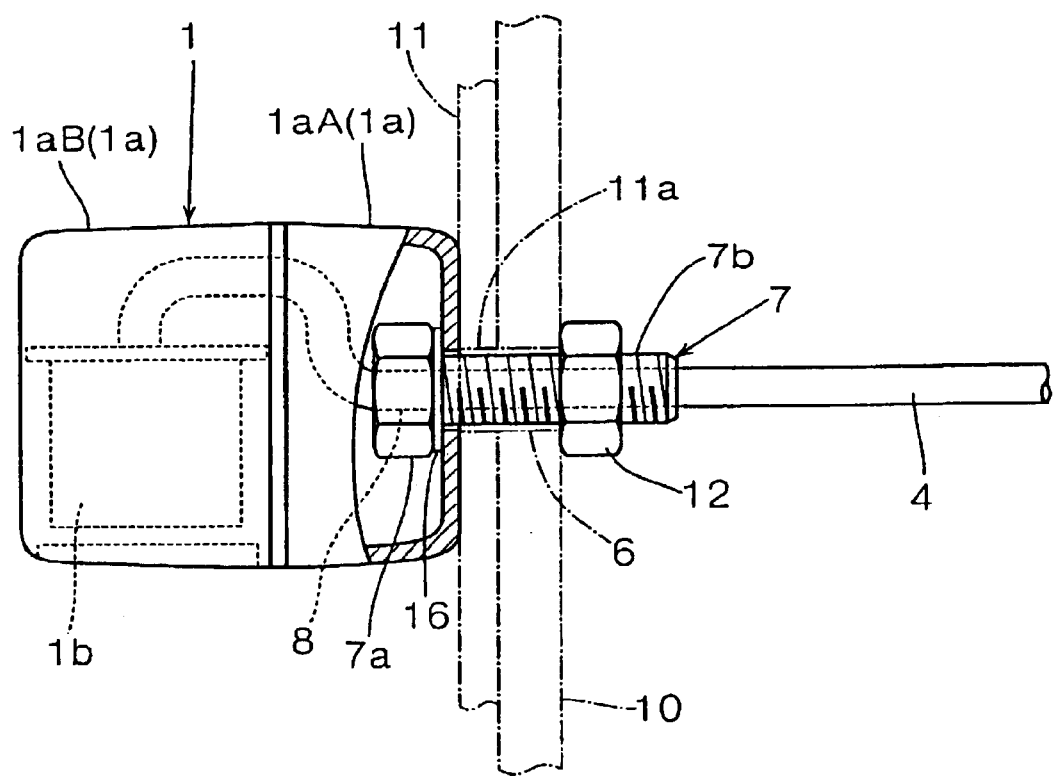
FIG. 3 is a sectional view showing an installation structure for a camera according to the first embodiment.
Figure 4:
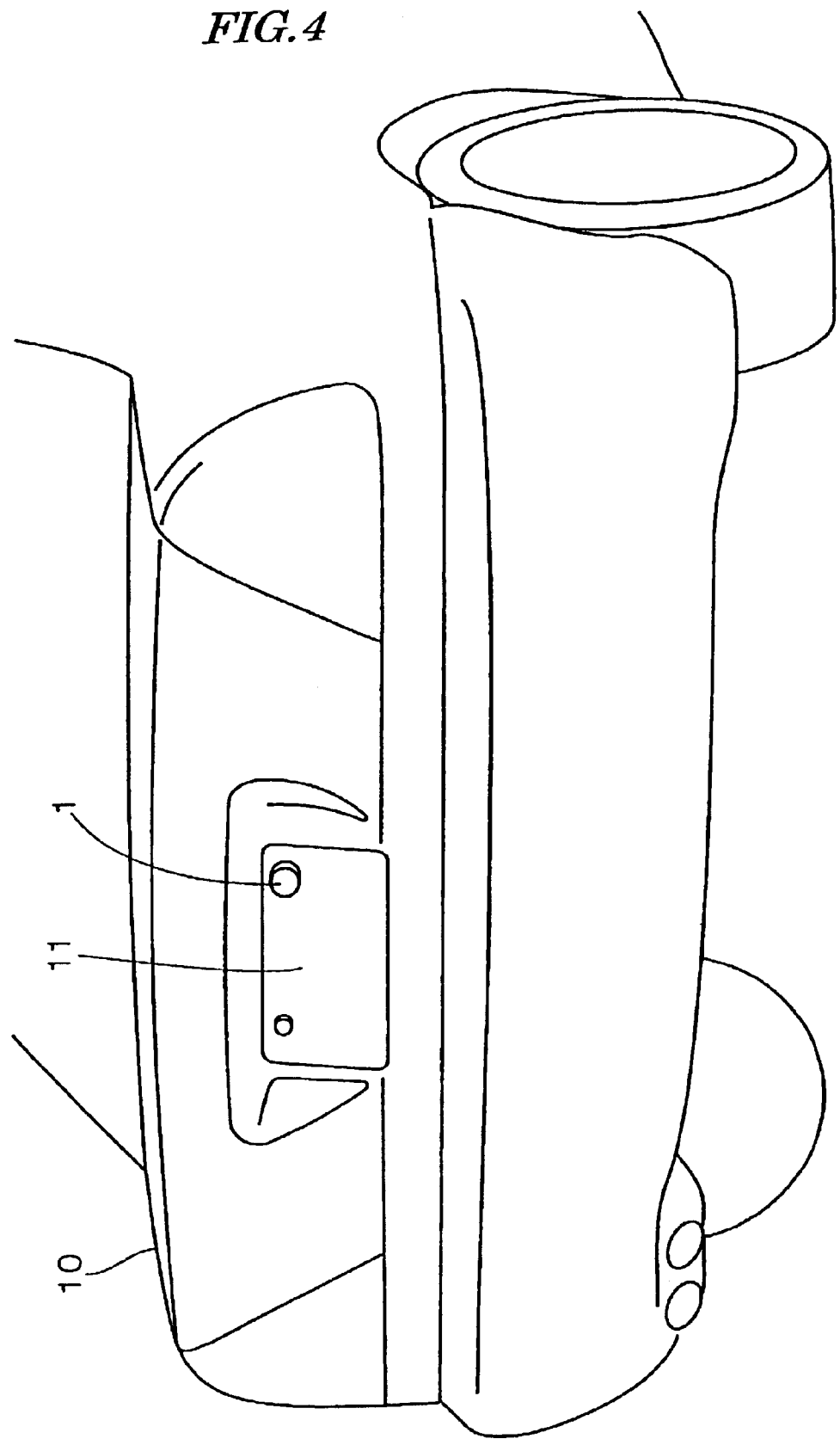
FIG. 4 is a perspective view showing an example of use of the installation structure for a camera.

FIG. 1 is a view showing a structure of a camera system. FIG. 2 is a partial sectional view showing a bolt of an installation structure for a camera. FIG. 3 is a sectional view showing an installation structure for a camera according to the first embodiment. FIG. 4 is a perspective view showing an example of use of the installation structure for a camera.

A camera installed with the installation structure of the invention is used for monitoring a rear view of a car, or a visitor at an entrance door. As shown in FIG. 1, a camera system is composed of a camera 1, a power supply 2, a monitor 3, a cable 4 including a power cable 4a for supplying power from the power supply 2 to the camera 1 and a signal cable 4b for transmitting a signal between the camera 1 and the monitor.

The camera 1 has an image sensor 1b disposed in a case 1a. In the embodiments of the invention, the image sensor 1b is a CMOS (Complementary Metal Oxide Semiconductor) sensor having CMOS as light receptive elements and an analog circuit. The case 1a of the camera 1 is installed at a desired position to be monitored, and the monitor 3 placed away from the camera 1 displays an image taken by the image sensor 1b.

Hereafter, the first embodiment of the installation structure for installing the camera 1 at a desired position will be explained. The installation structure includes a bolt 7 to be inserted in an installation hole 6. The bolt 7 extends from a top part 7a to an end of a screw part 7b, and a hole 8 is formed in the bolt 7 along an axis thereof. In the first embodiment shown in FIG. 3, the installation hole 6 is a hole for fixing a license plate 11 to a car 10.

As shown in FIG. 3, the bolt 7 is inserted into a hole 11a of the number plate 11 and an installation hole 6 provided at a panel of a car 10. In general, a nut 12 is welded at an inner side of the installation hole 6 on the panel of the car 10, so that an ordinary bolt is fixed to the hole. The screw part 7b of the bolt 7 has the same screw pitch as that of the ordinary bolt, and is screwed in the nut 12.

The camera 1 is fixed with the bolt 7 and nut 12. The case 1a of the camera 1 is divided into a part 1aA and a part 1aB having the image sensor 1b therein. The part 1aA and number plate 11 is fixed together to the installation hole 6 with a washer 16, the bolt 7 and the nut 12. The cable 4 connected to the image sensor 1b passes through the hole 8 of the bolt 7. Then, the part 1aB is attached to the part 1aA, thereby fixing the camera 1.

As shown in FIG. 4, the camera 1 is installed by using the installation hole 6 whose original purpose is to fix the license plate 11 to the car 10. Thus, it is possible to install the camera 1 without punching a new hole. Furthermore, the camera 1 is installed at a position where an original bolt is supposed to be inserted, thereby making the camera 1 less noticeable.

The cable 4 is inserted through the hole 8 of the bolt 7, which passes through the installation hole 6 for the license plate 11 of the car 10. Therefore, it is possible to accommodate the cable 4 without punching a new hole. Further, the head part 7a of the bolt 7 is located inside the case 1a of the camera 1 as shown in FIG. 3, thereby making the cable 4 invisible from outside the camera 1 to obtain a good appearance.

Figure 5A:
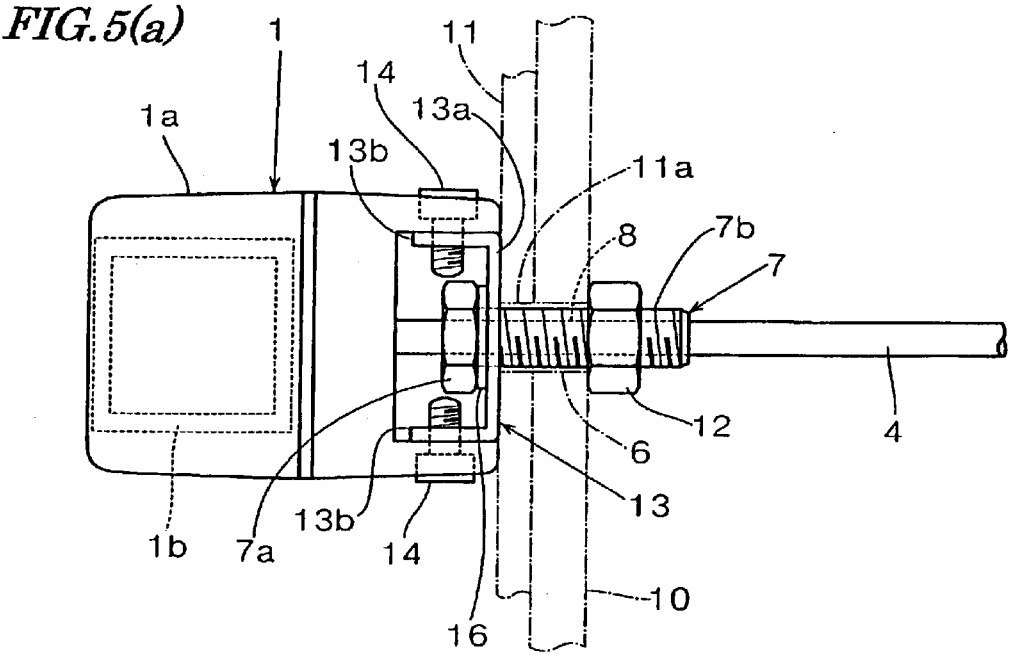
FIG. 5(a) is a view showing an installation structure for a camera according to the second embodiment.
Figure 5B:
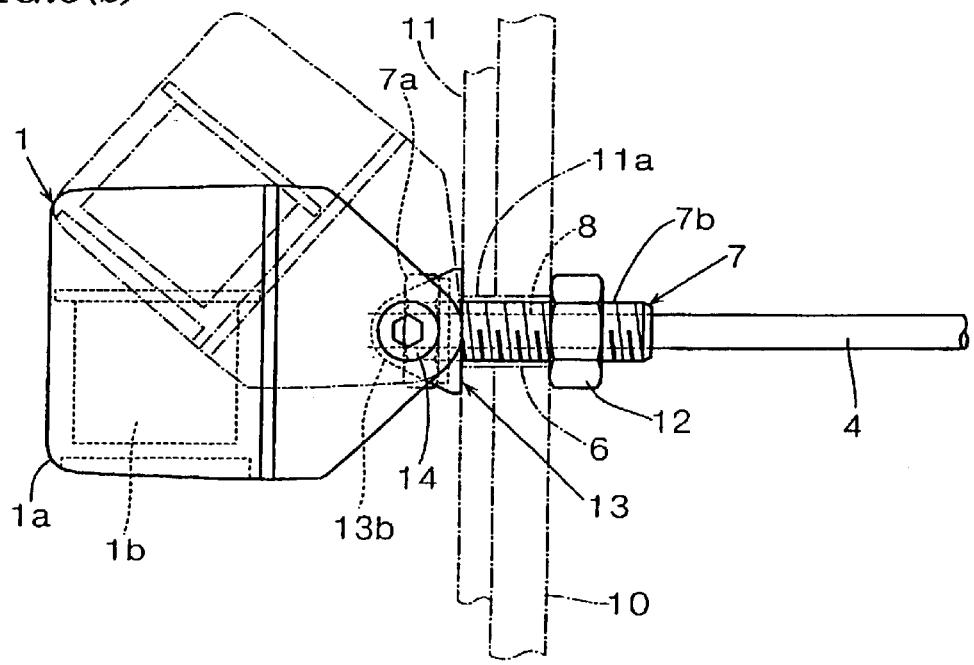
FIG. 5(b) is a view showing the installation structure for a camera according to the second embodiment.

Hereunder, the second embodiment of the invention will be explained. FIG. 5(a) is a view showing an installation structure for a camera according to the second embodiment. FIG. 5(b) is also a view showing the installation structure for a camera according to the second embodiment.

According to the second embodiment of the invention, similar to the installation structure of the first embodiment, the installation hole 6 is the hole for fixing the license plate 11 of the car 10. The same reference numerals denote the same parts in the first embodiment, thereby omitting the explanation.

As shown in FIGS. 5(a) and 5(b), the bolt 7 is inserted into the hole 11a of the license plate 11, and the installation hole 6 provided at the panel of the car 10. Then, the bolt 7 is screwed into the nut 12 disposed at the inner side of the installation hole 6.

The camera 1 is fixed with the bolt 7 and the nut 12. In the second embodiment, an installation member 13 is used for the installation.

As shown in FIG. 5(a), the installation member 13 is formed in a U-shape, and has arms 13b extending parallel from both ends of a plate 13a. The plate 13a has a hole for inserting the screw part 7b of the bolt 7, and each of the arms 13b has a hole.

The plate 13a and the number plate 11 are fixed together to the installation hole 6 with the washer 16, bolt 7 and nut 12. The cable 4 connected to the image sensor 1b is inserted in the hole 8 of the bolt 7. Then, the case 1a of the camera 1 is fixed to the arms 13b of the installation member 13 with screws 14, thereby installing the camera 1.

As shown in FIG. 4, the camera 1 is installed by using the installation hole 6 whose original purpose is to fix the license plate 11 to the car 10. Thus, it is possible to install the camera 1 without punching a new hole. Furthermore, the camera 1 is installed at a position where an original bolt is supposed to be inserted, thereby making the camera 1 less noticeable.

The cable 4 passes through the hole 8 of the bolt 7 while passing through the installation hole 6 for the license plate 11 of the car 10. Therefore, it is possible to accommodate the cable 4 without punching a new hole. Further, as shown in FIG. 5(a), the camera is fixed with the bolt 7 holding the cable inside. Accordingly, the cable 4 extending from the camera 1 is directly inserted in the bolt 7, thereby minimizing a visible portion of the cable 4 to obtain a good appearance.

Furthermore, the camera 1 is installed with the screws 14 fitted to the holes disposed at the arms 13b of the installation member 13. Thus, it is possible to change a viewing angle of the camera around the screws 14 by loosening the screws 14, as shown in FIG. 5(b). With this structure, it is possible to adjust a view angle of the camera 1.

In the first and second embodiments mentioned above, the camera 1 is fixed with the bolt 7 holding the cable 4 inside. Alternatively, the camera may be attached to the car 10 with a magnet 15 without the bolt 7, as shown in FIG. 6. In this case, the camera 1 can be attached to any location, thereby changing the location of the camera 1 freely.

Figures 7A, 7B:
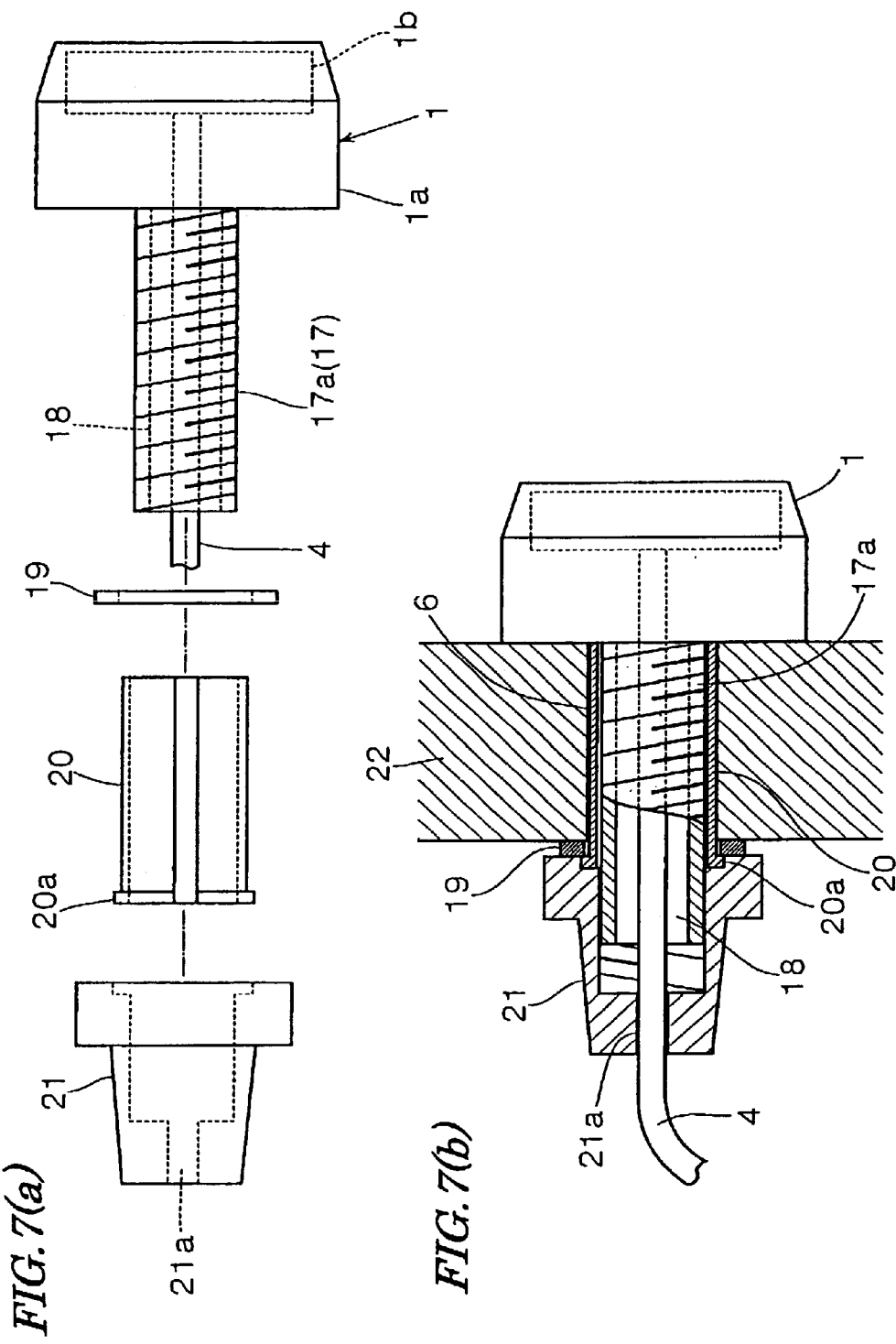
FIG. 7(a) is an exploded view showing an installation structure for a camera according to the third embodiment.
FIG. 7(b) is a sectional view showing the installation structure for a camera according to the third embodiment.

Hereunder, the third embodiment of the invention will be explained. FIG. 7(a) is an exploded side view showing an installation structure for a camera according to the third embodiment, and FIG. 7(b) is a sectional view showing the installation structure for a camera according to the third embodiment.

In the installation structure for a camera, a screw part 17a of a bolt 17 inserted into the installation hole 6 is integrated with the camera 1. The screw part 17a has a hole 18 formed along with the axis thereof. The hole 18 communicates with the inside of the case 1a of the camera 1. The cable 4 connected to the image sensor 1b in the case 1a passes through the hole 18. As shown in FIG. 7(b), the installation hole 6 is a peephole at an entrance door 22 whose original purpose is to accommodate a lens (not shown).

According to the third embodiment, the installation structure for a camera includes a washer 19 put on the screw part 17a, a support pipe component 20 inserted into the screw part 17a and having a flange part 20a for engaging the washer 19, and a nut 21 fitting to the screw part 17a.

With the above-mentioned structure, before the camera 1 is installed, the lens originally disposed in the installation hole 6 (peephole) of the entrance door 22 is removed, and the screw part 17a is inserted into the hole from the outside of the door 22.

The washer 19 is put on the screw part 17a projecting from the installation hole 6 from the inside of the entrance door 22. Then, the support pipe component 20 is inserted into the installation hole 6 from the inside of the entrance door 22 while holding the screw part 17a inside thereof. Subsequently, the camera 1 is installed by screwing the nut 21 to the screw part 17a from the inside of the entrance door 22. In the embodiment, the nut 21 is a so-called cap nut, and a hole 21a is formed at a cap part for inserting the cable 4.

As shown in FIG. 7(a), the camera 1 is installed by using the installation hole 6 (peephole) at the entrance door 22. Thus, it is possible to install the camera 1 without punching a new hole. Furthermore, the camera 1 is installed at a position where the lens is supposed to be inserted, thereby making the camera 1 less noticeable.

Further, the cable 4 passes through the hole 18 of the bolt 17a while passing through the installation hole 6 (peephole) for the lens at the entrance door 22. Thus, it is possible to fix the camera 1 without punching a new hole. As shown in FIG. 7(b), since the screw part 17a is integrated with the camera 1, the cable 4 is not visible from the outside of the camera 1 (outside the door 22), thereby obtaining a good appearance.

Since the cable 4 is not visible from the outside of the camera 1, it is difficult to cut the cable 4 off when the camera 1 is installed at the door for safety.

As explained above, according to the installation structures for the camera of the invention, the camera is installed with the bolt inserted into the installation hole, and the cable connected to the camera passes through the hole of the bolt. With the installation structures, the camera is easily installed without punching a new hole. Moreover, since the cable passes through the hole of the bolt, the cable is accommodated without punching a new hole for guiding the cable.

Since the bolt may be integrated with the camera, the cable is not visible from the outside of the camera, thereby obtaining a good appearance.

When the camera is installed with the bolt through the angle variable member, it is possible to easily adjust the view angle of the camera. Further, when the camera is installed with the magnet, it is possible to install the camera at a desired location.

In case that there is the hole for fixing the license plate to the car, it is possible to install the camera without punching a new hole. Furthermore, the camera is installed at the position where the original bolt is supposed to be inserted, thereby making the camera less noticeable.

In the case that the installation hole is the peephole at the house door, the bolt is inserted into the peephole instead of the lens. Therefore, it is possible to install the camera without punching a new hole in the door. Furthermore, the camera is installed at the position where the lens is supposed to be disposed, thereby making the camera 1 less noticeable.

While the invention has been explained with reference to the specific embodiments of the invention, the explanation is illustrative and the invention is limited only by the appended claims.

What is claimed is:

1. An installation structure for installing a camera, comprising:
    an entrance door as a frame having a peephole,
    a bolt having a through hole therein, said bolt passing through the peephole and fixed to the frame,
    a camera body having a case fixed to the bolt as a head thereof and located at an outer side of the entrance door, an image sensor for sensing an image attached to the case at a side opposite to the bolt, and a cable attached to the image sensor and passing through the case and the through hole, and
    a nut engaging the bolt for fixing the bolt with the camera body to the entrance door.

2. An installation structure according to claim 1, wherein said bolt is integrally formed with the case of the camera body.

3. An installation structure according to claim 2, further comprising a support pipe having a hollow cylindrical body with a diameter smaller than that of the installation hole and larger than an outer diameter of the bolt so that the support pipe is situated in a gap between the bolt and the installation hole.

* * * * *